(12) United States Patent
Xing et al.

(10) Patent No.: US 7,217,671 B1
(45) Date of Patent: May 15, 2007

(54) FIBER MAT AND PROCESS FOR MAKING SAME

(75) Inventors: Linlin Xing, Wayne, NJ (US); William Bittle, York, SC (US)

(73) Assignee: Building Materials Investment Corporation, Wilmington, DE (US)

( * ) Notice: Subject to any disclaimer, the term of this patent is extended or adjusted under 35 U.S.C. 154(b) by 63 days.

(21) Appl. No.: 11/281,656

(22) Filed: Nov. 17, 2005

(51) Int. Cl.
*B32B 17/02* (2006.01)
*B32B 5/02* (2006.01)
*B32B 7/12* (2006.01)

(52) U.S. Cl. ............ 442/180; 428/299.4; 428/355 AK; 442/154

(58) Field of Classification Search ............. 428/299.4, 428/325; 442/154, 180
See application file for complete search history.

(56) References Cited

U.S. PATENT DOCUMENTS

| | | | |
|---|---|---|---|
| 2002/0110571 A1* | 8/2002 | Kanji et al. | 424/401 |
| 2003/0059448 A9* | 3/2003 | Kanji et al. | 424/401 |

\* cited by examiner

*Primary Examiner*—Lynda Salvatore
(74) *Attorney, Agent, or Firm*—Walter Katz; William J. Davis

(57) ABSTRACT

A fiber mat comprises fibers; a resinous fiber binder; and a binder modifier which is a methacrylate/C1-2 succinate/hydroxyacrylate copolymer.

6 Claims, No Drawings

FIBER MAT AND PROCESS FOR MAKING SAME

BACKGROUND OF THE INVENTION

1. Field of the Invention

The present invention relates generally to a fiber mat and a process of making the same, and, more particularly, to a glass fiber mat comprising fibers, a binder and a defined binder modifier. Embodiments of the present invention can have desired characteristics, such as, for example, improved wet web strength, as compared with a conventional mat where no such defined binder modifier is employed, and can be suitable for use in building materials.

2. Description of the Prior Art

High strength fiber mats are increasingly used in the building materials industry, most commonly in roofing shingles. Fiber mats have numerous other material applications, including use in roofing, siding and floor underlayment; insulation facers; floor and ceiling tile; and vehicle parts.

Various fiber mats and methods of making the same have been described previously. For example, U.S. Pat. Nos. 4,135,029; 4,258,098; 5,914,365; and 6,642,299, describe glass fiber mats made by a wet-laid process formed from glass fibers held together by a binder material. Typically, in wet processed glass fiber mats, the binder is applied in liquid form and dispersed onto the glass fibers by an applicator. Conventional wet processes strive to produce a uniform coating of binder on the glass fibers. After the binder and glass fibers have been dried and cured, the glass fiber mat is cut as desired.

A major problem in the manufacturing process and use of some known fiber mats is inadequate wet web strength. The wet web strength of wet glass mat has significant impact on glass mat production and mat properties. In order to prevent the mat web from breaking during production, the speed of the production line has to be adjusted (reduced) to the low wet web strength of the wet glass mat before curing. Also, a lower wet web strength requires a higher vacuum drawing to support the wet web and to minimize web breaking. However, a higher vacuum drawing will lead to undesired mat properties, for example, a high mat tensile ratio.

SUMMARY OF THE INVENTION

Responsive to the foregoing challenges, an improved fiber mat for use in a building materials component has been developed. In one embodiment, the invention fiber mat includes a plurality of fibers; a resinous fiber binder, the fibers being fixedly distributed in the binder; and a binder modifier which is a methacrylates/C1-2 succinates/hydroxyacrylates copolymer. By "fixedly distributed", it is meant chemically bonded with binder. The binder modifier comprises 0.1 wt. % to 50 wt. %, based on the weight of the binder.

The present invention also relates to a binder composition which includes a blend of a resinous fiber binder and a binder modifier which is a methacrylates/C1-2 succinates/hydroxyacrylates copolymer.

In addition to the above, the present invention also provides a process for making an improved fiber mat. In one embodiment, the process comprises the steps of: forming an aqueous fiber slurry; removing water from the fiber slurry to form a wet fiber mat; saturating the wet fiber mat with an aqueous solution of a fiber binder and binder modifier, and forming, via drying and curing, a fiber mat product from the wet fiber mat.

The fiber mats in accordance with the embodiments of the present invention are particularly suitable for use as a component of building materials. In addition, the process of making fiber mats in accordance with the embodiments of the present invention can provide an improved wet web strength to an uncured mat.

In this invention, the glass mats made from resin binder and the acrylate copolymer binder modifier exhibits improved wet web strength.

Additional advantages of embodiments of the present invention are set forth, in part, in the description which follows and, in part, will be apparent to one of ordinary skill in the art from the description and/or from the practice of the invention.

DETAILED DESCRIPTION OF THE INVENTION

As stated above, the fiber mat of the present invention comprises a plurality of fibers fixedly distributed in a fixative composition. The fixative composition comprises 0.05 wt. % to 45 wt. % of fiber binder, based on the weight of the fiber mat product, and 0.1 wt. % to 50 wt. % of the binder modifier based on the binder weight.

The preferred binder modifier of the invention is a methacrylates/C1-2 succinates/hydroxyacrylates copolymer available commercially as Allianz™ LT-120 (International Specialty Products). Allianz™ LT-120 is a low viscosity acrylate-based, aqueous emulsion polymer. The polymer architecture is a random, linear copolymer derived from methacrylic acid, alkene succinic acids, alkyl and hydroxyl alkyl esters of acrylic and methacrylic acid.

Structurally, Allianz™ LT-120 can be represented as:

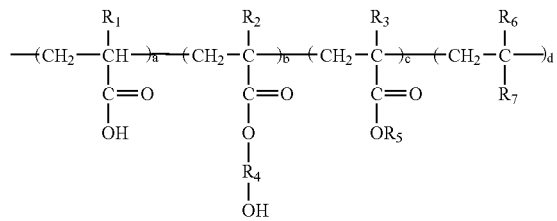

$R_{1,2}=CH_3$ $R_3=H$ or $CH_3$ $R_4=$Alkylene $R_5=$Alkyl $R_{6,7}=$Acid Group a, b, c and d are independently 1–5.

In one embodiment of the present invention, the fiber binder comprises a formaldehyde type resin. The fiber binder can include, but is not limited to, a urea/formaldehyde resin, a phenol/formaldehyde resin, a melamine/formaldehyde resin, and/or a mixture thereof. It is contemplated, however, that other binders, such as, for example, ethylene vinyl acetate, and other known resins adapted for binding mat fibers, can be used without departing from the scope and spirit of the present invention.

In one embodiment of the present invention, the urea-formaldehyde resin is a commercially available material, such as, for example, GP2997 supplied by Georgia Pacific Resins, Inc.; Dyneae® 246 from Dynea Co.; and Borden FG® 486D and Borden 607A; from Borden Chemical Inc. Other commercial formaldehyde resins, such as, for example, S-370I-C supplied by Pacific Resins and Chemicals, Inc.; and PR-913-23, supplied by Borden Chemical, Inc.; may be used as well. As will be apparent to those of ordinary skill in the art, other commercially or non-commercially available binders can be used without departing from the scope and spirit of the present invention.

In one embodiment of the present invention, the resinous fiber binder can contain methylol groups which, upon curing, form methylene or ether linkages. These methylols can include, for example, N,N'-dimethylol; dihydroxymethylolethylene; N,N'-bis(methoxymethyl), N,N'-dimethylol-propylene; 5,5-dimethyl-N,N'-dimethylolpropylene; N,N'-dimethylolethylene; N,N'-dimethylolethylene and the like.

In one embodiment, the weight ratio of resinous fiber binder to polymer binder modifier is 200:1 to 4:1. In one embodiment of the present invention, the weight ratio is more particularly 99:1 to 9:1.

The fiber binder and binder modifier are adapted to be compatible. These components can be intimately admixed in an aqueous medium to form a stable emulsion which does not become overly gummy, or gel, even after prolonged storage, e.g., for a period of a year or longer. This stability factor is advantageous in commercial use of the invention composition.

In one embodiment of the present invention, the fibers comprise glass fibers. The glass fibers can comprise individual fiber filaments having an average length in the range of, but not limited to: from about ¼ inch to about 3 inches, and an average diameter in the range of, but not limited to: from about 1 to about 50 microns ($\mu$). It is contemplated, however, that the glass fibers can be in another form, such as, for example, a continuous strand or strands. In an alternative embodiment of the present invention, the fibers can comprise other fibers, including, but not limited to: wood, polyethylene, polyester, nylon, polyacrylonitrile, and/or a mixture of glass and one or more of the other fibers. In one embodiment, the fiber mat can further comprise a small amount of filler, e.g., less than about 0.5%, based on the fiber weight. A fiber mixture can be optional for construction material applications, such as, for example, roofing and siding, because an excessive amount of filler can reduce porosity and vapor ventability of the fiber mat.

In the finished cured mat product, the fiber content can be in the range from about 55 wt. % to about 98 wt. %. In one embodiment of the present invention, the fiber content is more particularly in the range from about 70 wt. % to about 85 wt. %.

The fiber mat in accordance with one embodiment of the present invention can further comprise a fiber dispersing agent for dispersing the plurality of fibers in the fixative composition. The fiber dispersing agent can comprise, for example, tertiary amine oxides (e.g., N-hexadecyl-N,N-dimethyl amine oxide, bis(2-hydroxyethyl) tallow amine oxide, dimethyl hydrogenated tallow amine oxide, dimethylstearyl amine oxide and the like, and/or mixtures thereof). As will be apparent to those of ordinary skill in the art, other known dispersing agents can be used without departing from the scope and spirit of the present invention. The dispersing agent can be used in a concentration in the range from about 10 ppm to about 8,000 ppm, based on the amount of fiber, preferably 200 ppm to 1,000 ppm.

In one embodiment, the fiber mat can further comprise one or more viscosity modifiers to increase the viscosity of the binder and/or the fixative composition such that the settling time of the fibers is reduced and the fibers can be adequately dispersed. The viscosity modifier can include, but is not limited to, hydroxyethyl cellulose (HEC), polyacrylamide (PAA), and the like. As will be apparent to those of ordinary skill in the art, other viscosity modifiers can be used without departing from the scope and spirit of the present invention.

The fiber fixative composition employed herein can be prepared by blending the binder and binder modifier in water, under agitation, until a uniform mixture is obtained. The resulting aqueous mixture can then be used to saturate the wet mat of dispersed fibers, after which the excess mixture can be removed before drying and curing at an elevated temperature. Alternatively, an aqueous mixture of the binder alone can be prepared and applied to the wet mat of dispersed fibers, in which case the binder modifier can be separately and subsequently applied by spraying, dipping or other means. In still another alternative embodiment, all or a portion of the binder modifier can be applied over the mat after initiation of the drying and/or curing process.

The process of making a fiber mat in accordance with one embodiment of the present invention will now be described with particular reference to a wet-laid process. It is contemplated, however, that other processes known in the art, such as, for example, a dry-laid process, can be used without departing from the scope and spirit of the present invention. Furthermore, the process is described using chopped bundles of glass fibers. As discussed above, however, other types of fiber content are considered well within the scope of the present invention.

The process of forming glass fiber mats according to one embodiment of the present invention comprises adding chopped bundles of glass fibers of suitable length and diameter to a water/dispersant agent medium to form an aqueous fiber slurry. A viscosity modifier or other process aid can optionally be added to the water/dispersant agent medium. For example, about 0.05 to about 0.5 wt. % viscosity modifier in white water can be suitably added to the dispersant to form the slurry.

The glass fibers can be sized or unsized, and can be wet or dry, as long as they are capable of being suitably dispersed in the water/dispersant agent medium. The fiber slurry, containing from about 0.03 wt. % to about 8 wt. % solids, is then agitated to form a workable dispersion at a suitable and uniform consistency. The fiber slurry can be additionally diluted with water to a lower fiber concentration to between about 0.02 wt. % and about 0.08 wt. %. In one embodiment, the fiber concentration can be more particularly diluted to about 0.04 wt. % fiber. The fiber slurry is then passed to a mat-forming machine such as a wire screen or fabric for drainage of excess water. Then excess water can be removed with the assistance of vacuum.

The fibers of the slurry are deposited on the wire screen and drained to form a wet fiber mat. The wet mat is then saturated by soaking in an aqueous solution of the binder or binder modifier fixative composition. The aqueous solution can comprise, for example, from about 10 wt. % to about 40 wt. % solid. The wet mat can be soaked for a period of time sufficient to provide the desired fixative for the fibers. Excess aqueous binder or binder/modifier composition is then removed, preferably under vacuum.

After treatment with binder or binder/modifier composition, if desired, the mat is then dried and the fixative composition is cured in an oven at an elevated temperature (greater than about 150° C.). A temperature in the range of about 160° C. to about 350° C., for at least about 2 to 10 seconds, is typically used for curing. In one embodiment, a cure temperature in the range of about 225° C. to about 300° C. is used. In an alternative embodiment of the present invention, it is contemplated that catalytic curing can be provided with an acid catalyst, such as, for example, ammonium chloride, p-toluene sulfonic acid, or other suitable catalyst. As discussed above, any amount of binder modifier not included with the binder solution can be applied to the drained fiber slurry, the drained mat containing binder, and/or the cured product. The binder modifier can be applied as a spray and/or as a bath as an aqueous solution.

The combination of the binder and binder modifier used in various embodiments of the present invention provides several advantages over current binder compositions, particularly with respect to wet web strength.

Having generally described various embodiments of the present invention, reference is now made to the following examples which illustrate embodiments of the present invention and comparisons to a control sample. The following examples serve to illustrate, but are not to be construed as limiting to, the scope of the invention, as set forth in the appended claims.

PREPARATION OF GLASS MAT

Part A. In a 20 liter vessel at room temperature, under constant agitation, 5.16 g of chopped bundles of glass fibers, having an average 20–40 mm length and 12–20 micron diameter, were dispersed in 12 liters of water containing 800 ppm of N-hexadecyl-N,N-dimethylamine oxide to produce a uniform aqueous slurry of 0.04 wt. % fibers. The fiber slurry was then passed onto a wire mesh support with dewatering fabric, and a vacuum was applied to remove excess water and to obtain a wet mat containing about 60% fibers.

Part B. Aqueous samples of 24 wt. % solids containing urea/formaldehyde resin binder (UF) and Allianz™ LT-120 as binder modifier were separately prepared and applied to individual samples of wet glass mats prepared by the procedure of Part A. The individual wet mats then were soaked in the binder/modifier solutions under ambient conditions after which excess solution was removed under vacuum to provide binder/modifier wet mats containing 38 wt. % glass fibers, 12 wt. % binder/modifier and 50 wt. % water.

Part C. For comparison purposes, Control samples were prepared as described in Parts A and B except that the UF binder was used alone or with Omnova Genflo 3112 latex, a carboxylated styrene-butadiene copolymer latex.

Part D. The wet web strength of the above uncured wet mats was measured in the following way. The uncured wet mat was laid over a sheet of plastic with a hole in the center. Then weights were continuously added to the center of the mat to elongate the uncured mat to a defined distance. The final weight was recorded as the wet web strength of the uncured mat.

Part E. The mat samples made according to Parts A and B were dried and cured for 8 to 9 seconds at 270° C. to 300° C. to obtain dry glass mats weighing about 92 g/m$^2$ and having a Loss on Ignition (LOI) of about 24%.

TABLE

| | Compositions | | |
|---|---|---|---|
| Ingredient | Control-1 | Invention Example | Control-2 |
| UF Binder | FG486D | FG486D | FG486D |
| Binder Modifier | None | Allianz ™ LT-120 | Omnova Genflo 3112 |
| Modifier Chemistry | None | Methacrylate/C1–2 Succinate/ Hydroxyacrylate Copolymer | Carboxylated Styrene Butadiene Copolymer |
| UF:Modifier (w/w) | 100 | 99/1 | 99/1 |

| | Mat Properties | | | | |
|---|---|---|---|---|---|
| Property | Control-1 | Control-2 | Invention Example | Invention Example vs. Control-1 (% Increase) | Invention Example vs. Control-2 (% Increase) |
| Wet Web Strength (gf) | 151 | 159 | 233 | 54% | 47% |

The results show a significant increase in the wet web strength for the Invention Example over Control-1 or Control-2 samples.

What is claimed is:

1. A fiber mat comprising a plurality of fibers, a resinous fiber glass binder, said fibers fixedly distributed in said binder; and a binder modifier which is a methacrylate/C1-2 succinate/hydroxyacrylate copoloymer, in an amount of 0.1 wt. % to 50 wt. %, based on the weight of said binder.

2. A fiber mat of claim 1, wherein said resinous fiber binder comprises a formaldehyde type binder.

3. A fiber mat of claim 2, wherein said formaldehyde type binder is selected from the group consisting of urea/formaldehyde, a phenol/formaldehyde, and melamine/formaldehyde.

4. A fiber mat of claim 1, wherein the weight ratio of resinous fiber binder to said binder modifier is in the range from 200:1 to 4:1.

5. A fiber mat of claim 1, wherein said mat contains 55 wt. % to 98 wt. % of fibers and 0.05 wt. % to 45 wt. % of resinous fiber binder.

6. A fiber mat of claim 1, wherein said mat contains 55 wt. % to 98 wt. % glass fibers and 15 wt. % to 30 wt. % of resinous fiber binder.

* * * * *